US011175382B2

(12) United States Patent
Bialer et al.

(10) Patent No.: US 11,175,382 B2
(45) Date of Patent: Nov. 16, 2021

(54) ELEVATION ANGLE ESTIMATION IN HORIZONTAL ANTENNA ARRAY WITH DOPPLER AND VELOCITY MEASUREMENTS

(71) Applicant: GM GLOBAL TECHNOLOGY OPERATIONS LLC, Detroit, MI (US)

(72) Inventors: Oded Bialer, Petah Tivak (IL); Amnon Jonas, Jerusalem (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 362 days.

(21) Appl. No.: 16/441,759

(22) Filed: Jun. 14, 2019

(65) Prior Publication Data
US 2020/0393540 A1 Dec. 17, 2020

(51) Int. Cl.
*G01S 7/40* (2006.01)
*H01Q 3/26* (2006.01)
*G01S 13/42* (2006.01)
*G01S 13/02* (2006.01)

(52) U.S. Cl.
CPC .......... *G01S 7/4026* (2013.01); *G01S 13/426* (2013.01); *H01Q 3/26* (2013.01); *G01S 7/403* (2021.05); *G01S 2013/0254* (2013.01)

(58) Field of Classification Search
CPC ...... G01S 7/4026; G01S 13/426; G01S 7/403; G01S 2013/0254; H01Q 3/26
See application file for complete search history.

(56) References Cited

U.S. PATENT DOCUMENTS

| 4,929,952 | A  | * | 5/1990  | Schneider | G01S 7/4026 |
|           |    |   |         |           | 342/184     |
| 8,456,349 | B1 | * | 6/2013  | Piesinger | G01S 13/06  |
|           |    |   |         |           | 342/29      |
| 10,126,410| B2 | * | 11/2018 | Treptow   | G01S 13/931 |
| 2012/0019408 | A1 | * | 1/2012 | Lee    | G01S 13/426 |
|           |    |   |         |           | 342/83      |
| 2018/0024228 | A1 | * | 1/2018 | Schiffmann | G01S 13/86 |
|           |    |   |         |           | 342/174     |
| 2020/0049808 | A1 | * | 2/2020 | Bialer  | G01S 13/343 |
| 2020/0049811 | A1 | * | 2/2020 | Bialer  | G01S 13/589 |
| 2020/0326417 | A1 | * | 10/2020| Shapiro | G01S 13/589 |
| 2020/0363497 | A1 | * | 11/2020| Bialer  | G01S 13/931 |
| 2020/0371224 | A1 | * | 11/2020| Bialer  | G01S 13/931 |
| 2020/0386878 | A1 | * | 12/2020| Bialer  | G01S 13/343 |
| 2021/0011150 | A1 | * | 1/2021 | Bialer  | G01S 13/865 |
| 2021/0124033 | A1 | * | 4/2021 | Ziegler | G01S 7/4972 |
| 2021/0132212 | A1 | * | 5/2021 | Brosche | G01S 7/354  |

* cited by examiner

*Primary Examiner* — Carlos A Rivera
*Assistant Examiner* — Juliana Cross
(74) *Attorney, Agent, or Firm* — Cantor Colburn LLP

(57) ABSTRACT

A vehicle, radar system of the vehicle and method of determining an elevation of an object. The radar system includes a transmitter that transmits a reference signal and a receiver that to receive at least one echo signal related to reflection of the reference signal from an object. The receiver includes an antenna array having a plurality of horizontally-spaced antenna elements. A processor determines a first uncertainty curve associated with an azimuth measurement related to the at least one echo signal, determines a second uncertainty curve associated with a Doppler measurement and a velocity measurement related to the at least one echo signal, and locates an intersection of the first uncertainty curve and the second uncertainty curve to determine the elevation of the object.

21 Claims, 5 Drawing Sheets

ELEVATION ANGLE ESTIMATION IN HORIZONTAL ANTENNA ARRAY WITH DOPPLER AND VELOCITY MEASUREMENTS

INTRODUCTION

The subject disclosure relates to the use of radar systems in vehicles and, in particular, a system and method for determining an elevation of an object using a radar system that employs an array of horizontally-space antenna elements.

Vehicles can employ radar systems in order to have an awareness of their surroundings and objects in it. A radar system includes a transmitter antenna for transmitting a reference signal and a receiver antenna for receiving an echo signal resulting from reflection of the reference signal from an object. The transmitter antenna and/or the receiver antenna are often in the form of arrays of antenna elements aligned along a selected direction. Typically the array elements are aligned horizontally. This configuration gives the radar system a large horizontal aperture, resulting in increased azimuth resolution. This configuration however reduces the ability of the radar antenna to determine elevation information. Adding a vertically aligned antenna in order to determine elevation adds additional weight and cost to the vehicle. Accordingly, it is desirable to be able to estimate an elevation of an object using antenna arrays having horizontally-spaced antenna elements.

SUMMARY

In one exemplary embodiment, a method of determining an elevation of an object is disclosed. At least one echo signal is received from the object at an antenna array having a plurality of horizontally-spaced antenna elements. A first uncertainty curve associated with an azimuth measurement related to the at least one echo signal is determined. A second uncertainty curve associated with a Doppler measurement and velocity measurement related to the at least one echo signal is determined. An intersection of the first uncertainty curve and the second uncertainty curve is located to determine the elevation of the object.

In addition to one or more of the features described herein, the method further includes measuring a range, Doppler and azimuth of the object related to the at least one echo signal, determining a velocity vector of the object using the at least one echo signal, and determining the elevation from the range, Doppler, azimuth and velocity vector of the object. Determining the velocity vector of the object further includes determining velocity components in a plane transverse to the elevation direction. The method further includes determining the velocity vector of the object from a difference between a first location of the object at a first time and a second location of the object at a second time. In an embodiment in which the antenna array includes a first antenna array and a second antenna array, the method further includes determining the velocity vector of the object from a first Doppler measurement obtained at the first antenna array and a second Doppler measurement obtained at the second antenna array. The velocity vector of the object is determined using a separation distance between the first antenna array and the second antenna array. The method can include determining the elevation z from $$z = \sqrt{R^2 - x^2 - \left(\frac{Rv_r - v_x x}{v_y}\right)^2}$$

where R is a range of the object, x is related to an azimuth of the object, $v_r$ is the Doppler measurements, and $v_x$ and $v_y$ are x- and y-components, respectively, of the velocity vector. The method further includes navigating the vehicle based on the determined elevation of the object.

In another exemplary embodiment, a radar system for a vehicle disclosed. The radar system includes a transmitter configured to transmit a reference signal, a receiver comprising an antenna array having a plurality of horizontally-spaced antenna elements and configured to receive at least one echo signal related to reflection of the reference signal from an object, and a processor. The processor is configured to determine a first uncertainty curve associated with an azimuth measurement related to the at least one echo signal, determine a second uncertainty curve associated with a Doppler measurement and a velocity measurement related to the at least one echo signal, and locate an intersection of the first uncertainty curve and the second uncertainty curve to determine an elevation of the object.

In addition to one or more of the features described herein, the processor is further configured to measure a range, Doppler and azimuth of the object from the at least one echo signal, determine a velocity vector of the object using the at least one echo signal, and determine the elevation from the range, Doppler, azimuth and velocity vector of the object. The processor is further configured to determine the velocity vector of the object by determining velocity components in a plane transverse to the elevation direction. The processor is further configured to determine the velocity vector of the object from a difference between a first location of the object at a first time and a second location of the object at a second time. In an embodiment in which the antenna array includes a first antenna array and a second antenna array, the processor is further configured to determine the velocity vector of the object from a first Doppler measurement obtained at the first antenna array and a second Doppler measurement obtained at the second antenna array. The processor is further configured to determine the velocity vector of the object using a separation distance between the first antenna array and the second antenna array. The processor is further configured to navigate the vehicle based on the determined elevation of the object.

In yet another exemplary embodiment, a vehicle is disclosed. The vehicle includes a radar system and a processor. The radar system includes a transmitter configured to transmit a reference signal, and a receiver comprising an antenna array having a plurality of horizontally-spaced antenna elements and configured to receive at least one echo signal related to reflection of the reference signal from an object. The processor is configured to determine a first uncertainty curve associated with an azimuth measurement related to the at least one echo signal, determine a second uncertainty curve associated with a Doppler measurement related to the at least one echo signal, and locate an intersection of the first uncertainty curve and the second uncertainty curve to determine the elevation of the object.

The processor is further configured to measure a range, Doppler and azimuth of the object from the at least one echo signal, determine a velocity vector of the object using the at least one echo signal, and determine the elevation from the range, Doppler, azimuth and velocity vector of the object. The processor is further configured to determine the velocity vector of the object by determining velocity components in a plane transverse to the elevation direction. The processor is further configured to determine the velocity vector of the object from a difference between a first location of the object at a first time and a second location of the object at a second time. In an embodiment in which the antenna array includes a first antenna array and a second antenna array, the processor is further configured to determine the velocity vector of the object from a first Doppler measurement obtained at the first antenna array and a second Doppler measurement obtained at the second antenna array. The processor is further configured to determine the velocity vector of the object using a separation distance between the first antenna array and the second antenna array.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
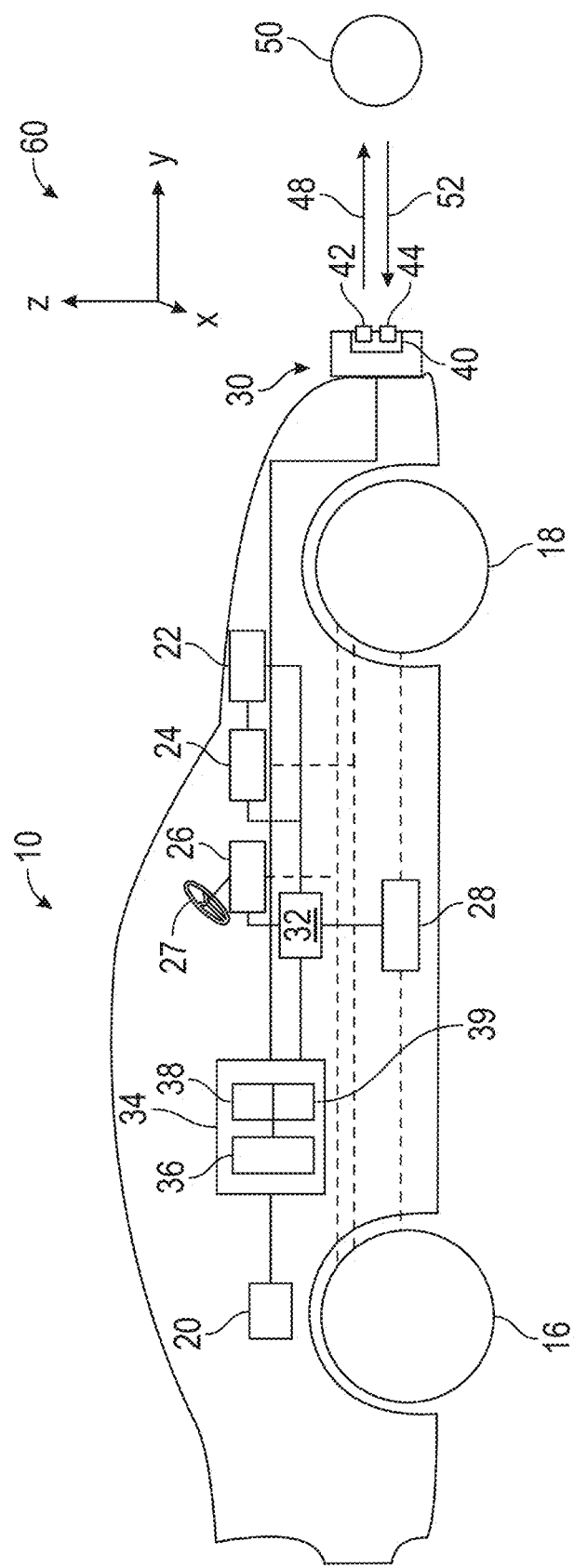
FIG. 1 shows an autonomous vehicle including a radar system having an antenna receiver array with horizontally-spaced antenna elements.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

The autonomous vehicle 10 generally includes at least a navigation system 20, a propulsion system 22, a transmission system 24, a steering system 26, a brake system 28, a sensor system 30, an actuator system 32, and a controller 34.

The navigation system 20 determines a trajectory plan for automated driving of the autonomous vehicle 10. The propulsion system 22 provides power for creating a motive force for the autonomous vehicle 10 and may, in various embodiments, include an internal combustion engine, an electric machine such as a traction motor, and/or a fuel cell propulsion system. The transmission system 24 is configured to transmit power from the propulsion system 22 to wheels 16 and 18 of the autonomous vehicle 10 according to selectable speed ratios. The steering system 26 influences a position of the wheels 16 and 18. While depicted as including a steering wheel 27 for illustrative purposes, in some embodiments contemplated within the scope of the present disclosure, the steering system 26 may not include a steering wheel 27. The brake system 28 is configured to provide braking torque to the wheels 16 and 18.

The sensor system 30 includes a radar system 40 that senses objects in an exterior environment of the autonomous vehicle 10 and provides various parameters of the objects. The radar system 40 includes a transmitter 42 and a receiver array 44. The receiver array 44 can be in the form of an array of horizontally spaced antenna elements (i.e., spaced along the x-axis of the coordinate system 60 shown in FIG. 1).

In operation, the transmitter 42 of the radar system 40 sends out a radio frequency (RF) reference signal 48 that is reflected back at the autonomous vehicle 10 by one or more objects 50 in the field of view of the radar system 40 as one or more reflected echo signals 52. The reference signal 48 can be a linear frequency modulated (LFM) or chirp signal that varies in frequency over a selected time duration. The one or more echo signals 52 can be used to determine various parameters of the one or more objects 50, such as a range of the object, Doppler frequency or relative radial velocity of the object, and azimuth, etc. While it is desired to determine an elevation of the object 50, the antenna elements of the receiver array 44 are aligned along a direction (i.e., x-axis) that is perpendicular to the elevation direction (i.e., y-axis) and is therefore not ideal for determining elevation. Methods disclosed herein allow for the determination of the elevation parameter using an array of horizontally-spaced receiver elements.

The actuator system 32 includes one or more actuators that control one or more vehicle features such as, but not limited to, the propulsion system 22, the transmission system 24, the steering system 26, and the brake system 28.

The controller 34 includes a processor 36 and a computer readable storage device or storage medium 38. The computer readable storage medium includes programs or instructions 39 that, when executed by the processor 36, operate the radar system 40 in order to obtain the various parameters of the object 50. The computer readable storage medium 38 may further include programs or instructions 39 that when executed by the processor 36, operate the navigation system 20 and/or the actuator system 32 according to the various parameters of the object 50 obtained by the radar system 40 in order to navigate the autonomous vehicle 10 with respect to the object 50. In various embodiments, the processor 36 operates the navigation system and/or actuator system 34 to navigate the autonomous vehicle 10 based on the determined elevation of the object 50.

The navigation system 20 builds a trajectory for the autonomous vehicle 10 based on data from the radar system 40 and any other parameters. The controller 34 can provide the trajectory to the actuator 32 to control the propulsion system 22, transmission system 24, steering system 26, and/or brake system 28 in order to navigate the autonomous vehicle 10 with respect to the object 50.

Figure 2:
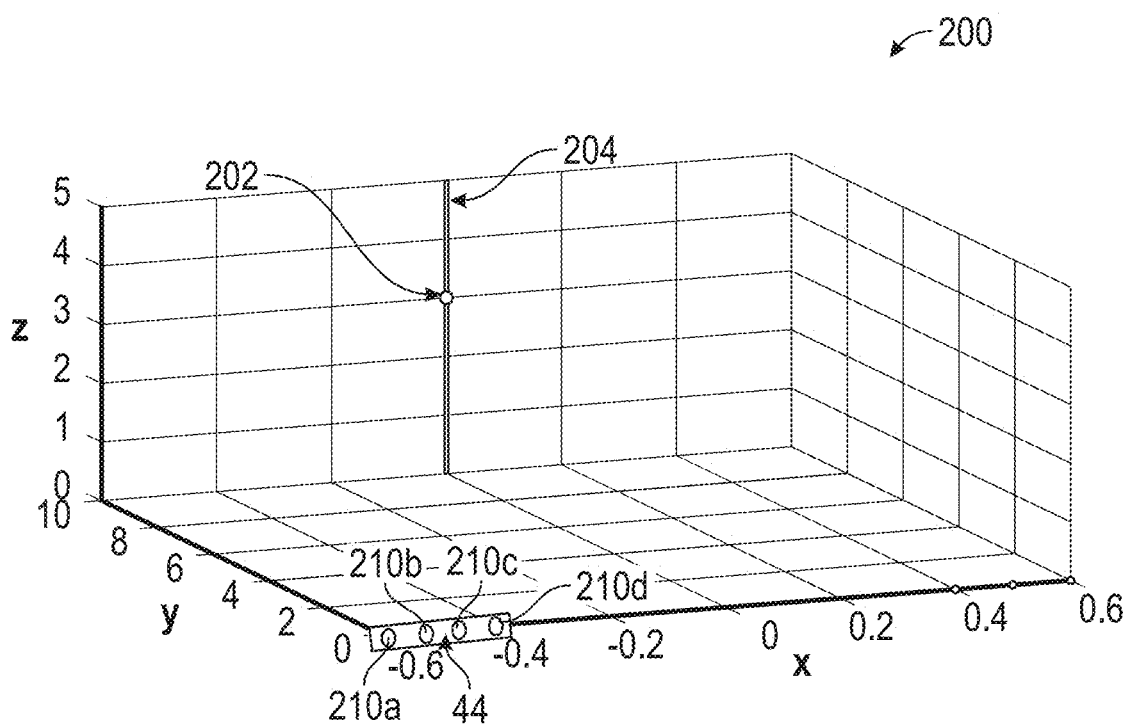
FIG. 2 shows a three-dimensional grid having the receiver array of the radar system centered at an origin.

FIG. 2 shows a three-dimensional grid 200 having the receiver array 44 of the radar system 40 centered at an origin. The grid 200 corresponds to the coordinate system 60 of FIG. 1. The receiver array 44 includes horizontally spaced antenna elements 210a, 210b, 210c and 210d aligned along the x-axis. A reflection point 202 indicating a location of an object 50, FIG. 1, is shown at a selected location within the grid 200. Phase measurements at the antenna elements 210a-210d determine an azimuth angle of the reflection point 202 with respect to the receiver array 44. However phase measurements provide relatively little or no information regarding the elevation of the reflection point 202. Thus a first uncertainty curve 204 is associated with the determined azimuth location. The first uncertainty curve 204 forms a vertical line within the grid 200 at a selected distance from the receiver array 44. The first uncertainty curve 204 indicates all possible elevations for the object given the determined azimuth.

Figure 3:
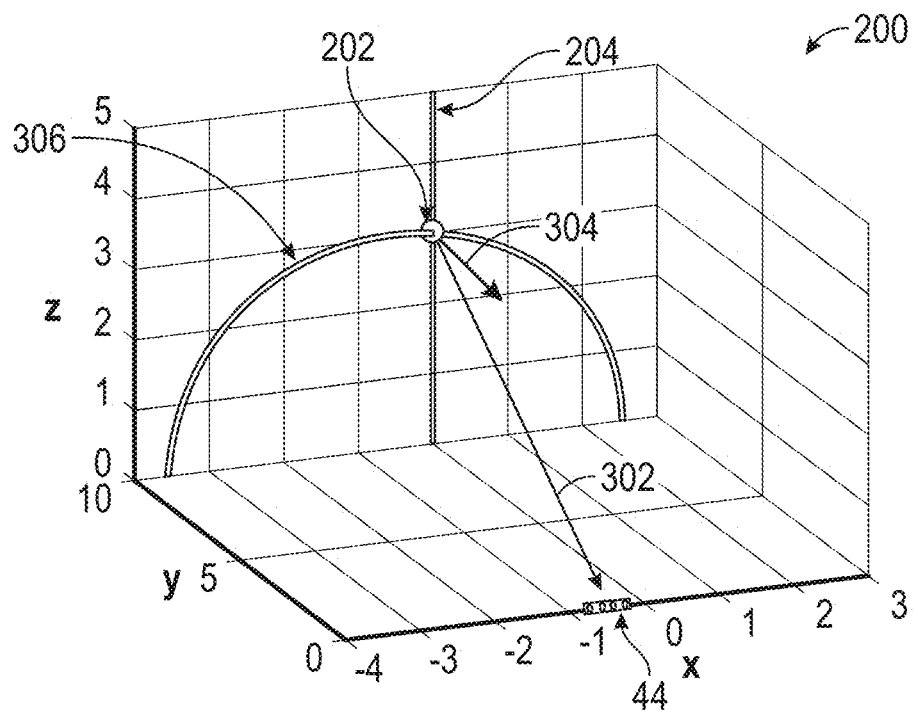
FIG. 3 shows the grid including two elevation uncertainties curves.

FIG. 3 shows the grid 200 including two elevation uncertainties curves. The first uncertainty curve 204 is associated with the phase measurements from FIG. 2. The second uncertainty curve 306 is associated with Doppler measurements and a velocity vector. The Doppler measurement determines a radial velocity 302 of the object along a radial line from the reflection point 202 to the receiver array 44. The Doppler measurement can be determined by transmitting a sequence of signals and measuring the received reflection phase variations along the received sequence. The Doppler measurement $v_r$ and the velocity vector have an associated second uncertainty curve 306 in the form of a circle at the selected distance of the reflection point 202. The intersection of the first uncertainty curve 204 and the second uncertainty curve 306 occurs at a possible reflection point 202.

The velocity vector can be determined using secondary calculations of the parameters obtained by the radar system 40. The radar system 40 transmits reference signal in 48 as a plurality of temporally-separated frames, resulting in a sequence of echo signals 52 received at different times at the receiver array 44. Using a single receiver array 44 with horizontally-spaced receiver elements, the velocity components $v_x$ and $v_y$ of the velocity vector 304 in a plane transverse to the elevation direction can be determined using the echo signals received at different times. A first location of the reflection point 202 is determined using a first echo signal received at the receiver array 44 at a first time, and a second location is determined using a second echo signal received at the receiver array 44 at a second time. The first location and the second location can be determined by a combination of range and azimuthal measurements for their respective echo signals. The components $v_x$, $v_y$ of the velocity vector 304 are determined by calculating the change between the first location and the second location divided by the time interval between the first time and the second time.

Figure 4:
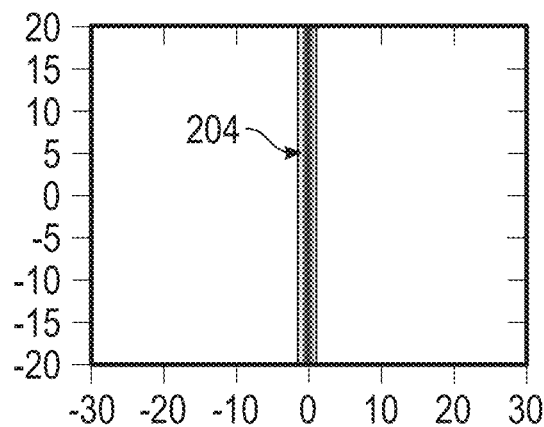
FIG. 4 shows the first uncertainty curve in the form of a vertical line.
Figure 5:
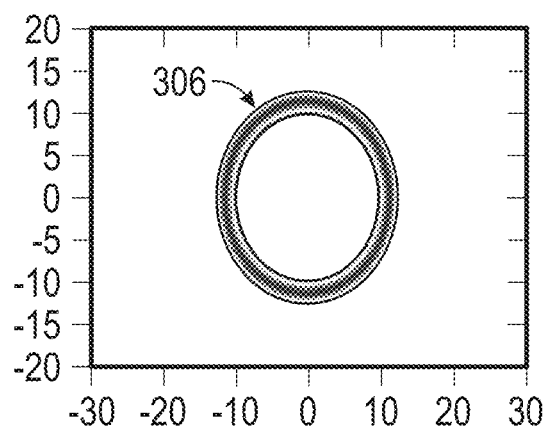
FIG. 5 shows the second uncertainty curve in the form of a circle.
Figure 6:
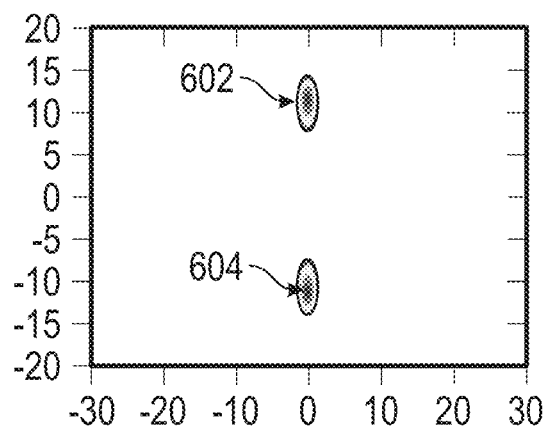
FIG. 6 shows the intersection points of the first uncertainty curve and the second uncertainty curve.

FIGS. 4-6 illustrate use of the first uncertainty curve 204 and second uncertainty curve 306 curve to determine an elevation of the reflection point. FIG. 4 shows the first uncertainty curve 204 in the form of a vertical line. FIG. 5 shows the second uncertainty curve 306 in the form of a circle. FIG. 6 shows the intersection points of the first uncertainty curve 204 and the second uncertainty curve 306. The first uncertainty curve 204 and the second uncertainty curve 306 intersect at a first intersection point 602 and at a second intersection point 604. The first intersection point 602 is elevated above the horizon (i.e., above zero elevation) and the second intersection point 604 is below the horizon. Based on its non-physical nature (i.e., second intersection 604 is below the horizon), the second intersection point 604 can be disqualified as a location of the reflection point 202. Therefore, the first intersection point 602 reveals the elevation of the reflection point 202.

The elevation z of the first and second intersection points can be determined mathematically using the other parameters determined via the radar system, as described herein. The range R of the reflection point is described using Eq. (1):

$$R=\sqrt{x^2+y^2+z^2} \qquad \text{Eq. (1)}$$

where (x, y, z) are the position Cartesian coordinates of the reflection point 202 with respect to the receiver array position 44 (i.e. when the receiver array 44 position is considered as the origin point (0,0,0)). Eq. (1) can be solved to express elevation z in terms of range, the x-coordinate and the y-coordinate, as shown in Eq. (2):

$$z=\sqrt{R^2-x^2-y^2} \qquad \text{Eq. (2)}$$

The Doppler measurement $v_r$ is related to the $v_x$ and $v_y$ components of the velocity vector by Eq. (3):

$$v_r = \frac{v_x x}{R} + \frac{v_y y}{R} \qquad \text{Eq. (3)}$$

which can be solved to determine the y-coordinate (y) in terms of range R, $v_r$, $v_x$, $v_y$, and azimuth (x), as shown in Eq. (4):

$$y = \frac{Rv_r - v_x x}{v_y} \qquad \text{Eq. (4)}$$

Substituting Eq. (4) into Eq. (2) yields Eq. (5):

$$z = \sqrt{R^2 - x^2 - \left(\frac{Rv_r - v_x x}{v_y}\right)^2} \qquad \text{Eq. (5)}$$

Eq. (5) therefore expresses elevation z in terms of parameters that can be determined by the radar system: range R, azimuth x, Doppler $v_r$, and x- and y-velocity components ($v_x$, $v_y$). It is noted that the square root function produces both positive and negative values, mathematically. With respect to FIG. 6, the positive value is related to the first intersection point 602 and the negative value is related to the second intersection point 604. Selecting the first intersection point 602 as the physical solution corresponds to selecting the positive square root value of Eq. (5).

Figure 7:
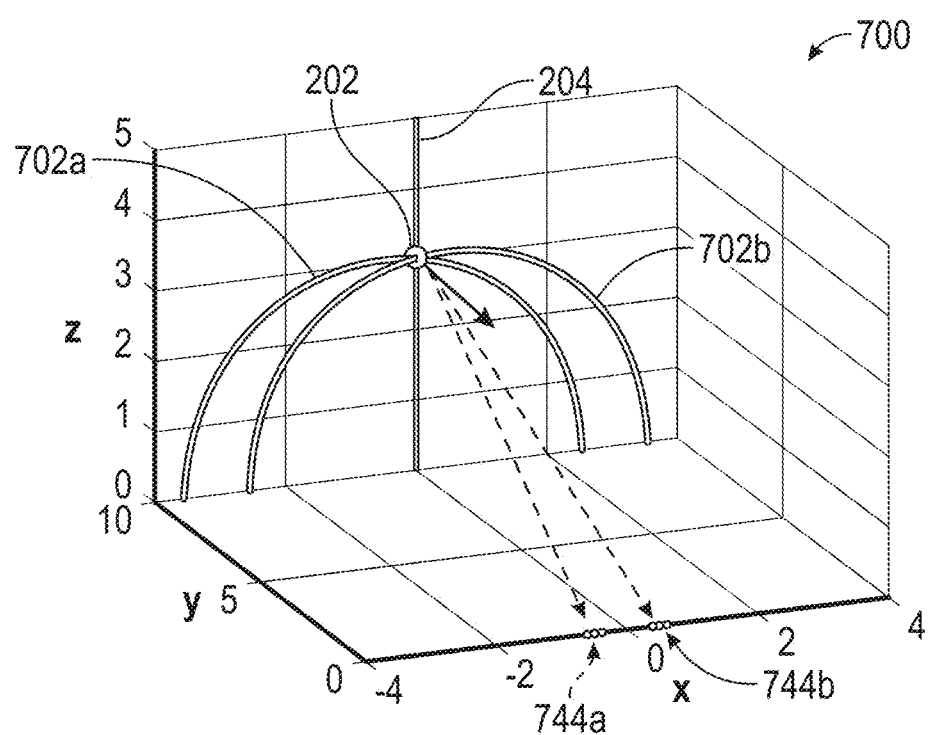
FIG. 7 illustrates an alternate method for determining a velocity vector using a plurality of antenna arrays.

FIG. 7 illustrates an alternate method for determining a velocity vector using a plurality of antenna arrays. FIG. 7 shows a grid 700 having a first antenna array 744a and a second antenna array 744b spaced horizontally from each other, each of the first and second antenna arrays 744a and 744b having horizontally spaced antenna elements therein. The first antenna array 744a and the second antenna array 744b are spaced on left and right sides, respectively, of an origin along an x-axis of the grid 700. A first Doppler measurement $v_{r1}$ determined using the first antenna array 744a has an associated first antenna uncertainty curve 702a. A second Doppler measurement $v_{r2}$ determined using the second antenna array 744b has an associated second antenna uncertainty curve 702b. The first antenna uncertainty curve 720a and the second antenna uncertainty curve 702b each are in the form of circles that are offset from each other.

These curves 702a and 702b intersect each other as well as the first uncertainty curve 204 associated with the phase measurements at reflection point 202. In addition, the first and second antenna arrays 744a, 744b can be used to determine a velocity vector of the object without having to obtaining a second frame of measurements. The velocity components $v_x$ and $v_y$ can be determined from the first Doppler measurement $v_{r1}$ and the second Doppler measurement $v_{r2}$, given a knowledge of the separation distance between the first antenna array 744a and the second antenna array 744b.

Figure 8:
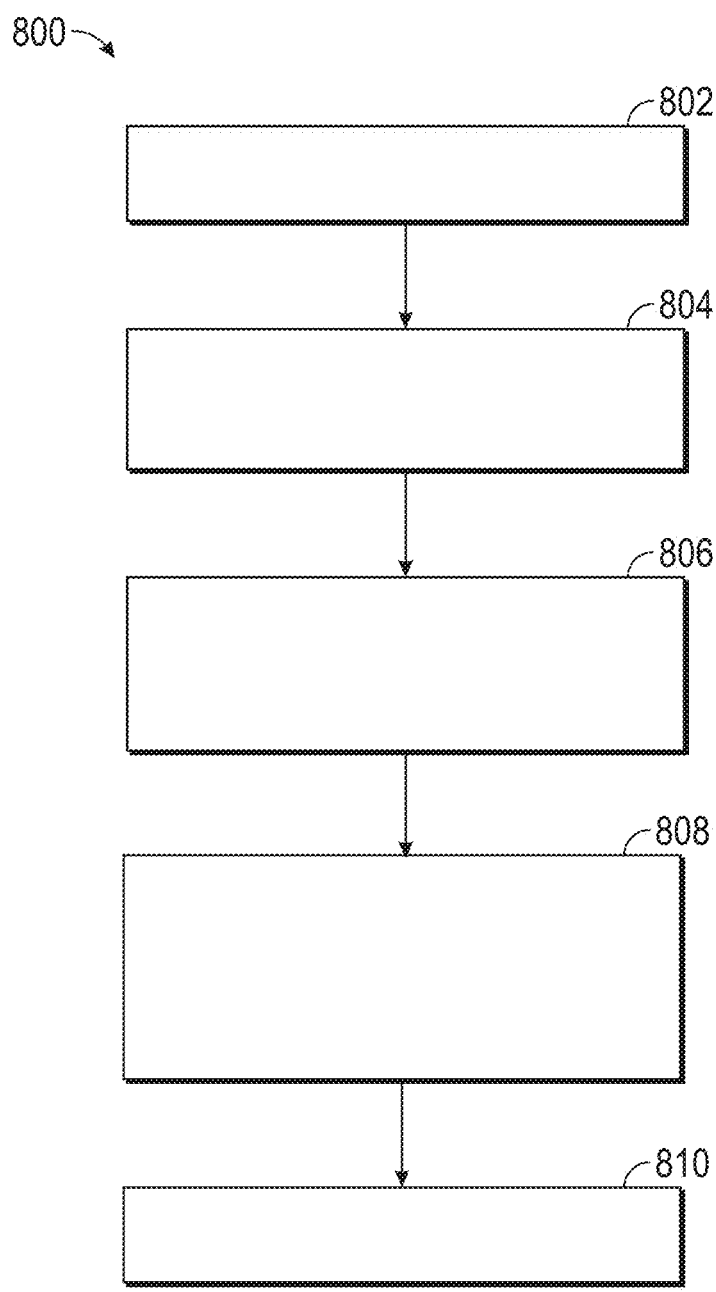
FIG. 8 shows a flowchart illustrating a method for determining an elevation parameter of a reflection point using a receiver array having horizontally spaced antenna elements.

FIG. 8 shows a flowchart 800 illustrating a method for determining an elevation parameter of a reflection point using a receiver array having horizontally spaced antenna elements. In box 802, echo signals are received at the receiver array. In box 804, the radar system or other processor determines Doppler frequency, range and azimuth angle from the echo signals. In box 806, velocity components $v_x$ and $v_y$ are determined from either the difference in the position of the reflection point over multiple frames, as discussed with respect to FIG. 3 or using multiple radars, as discussed with respect to FIG. 7. In box 808, the height or elevation of the reflection point 202 is determined using Eq. (5). In box 810, the coordinate of the reflection point can be determined from the results of box 808.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of determining an elevation of an object, comprising:
    receiving at least one echo signal from the object at an antenna array having a plurality of horizontally-spaced antenna elements;
    determining a first uncertainty curve associated with an azimuth measurement related to the at least one echo signal;
    determine a second uncertainty curve associated with a Doppler measurement and velocity measurement related to the at least one echo signal; and
    locating an intersection of the first uncertainty curve and the second uncertainty curve to determine the elevation of the object.

2. The method of claim 1, further comprising:
    measuring a range, Doppler and azimuth of the object related to the at least one echo signal;
    determining a velocity vector of the object using the at least one echo signal; and
    determining the elevation from the range, Doppler, azimuth and velocity vector of the object.

3. The method of claim 2, wherein determining the velocity vector of the object further comprises determining velocity components in a plane transverse to the elevation direction.

4. The method of claim 2, further comprising determining the velocity vector of the object from a difference between a first location of the object at a first time and a second location of the object at a second time.

5. The method of claim 2, wherein the antenna array includes a first antenna array and a second antenna array, the method further comprising determining the velocity vector of the object from a first Doppler measurement obtained at the first antenna array and a second Doppler measurement obtained at the second antenna array.

6. The method of claim 5, further comprising determining the velocity vector of the object using a separation distance between the first antenna array and the second antenna array.

7. The method of claim 2, further comprising determining the elevation z from $$z = \sqrt{R^2 - x^2 - \left(\frac{Rv_r - v_x x}{v_y}\right)^2}$$

where R is a range of the object, x is related to an azimuth of the object, $v_r$ is the Doppler measurements, and $v_x$ and $v_y$ are x- and y-components, respectively, of the velocity vector.

8. The method of claim 1, further comprising navigating a vehicle based on the determined elevation of the object.

9. A radar system for a vehicle, comprising:
    a transmitter configured to transmit a reference signal;
    a receiver comprising an antenna array having a plurality of horizontally-spaced antenna elements and configured to receive at least one echo signal related to reflection of the reference signal from an object; and
    a processor configured to:
        determine a first uncertainty curve associated with an azimuth measurement related to the at least one echo signal;
        determine a second uncertainty curve associated with a Doppler measurement and a velocity measurement related to the at least one echo signal; and
        locate an intersection of the first uncertainty curve and the second uncertainty curve to determine an elevation of the object.

10. The radar system of claim 9, wherein the processor is further configured to:
    measure a range, Doppler and azimuth of the object from the at least one echo signal;
    determine a velocity vector of the object using the at least one echo signal; and
    determine the elevation from the range, Doppler, azimuth and velocity vector of the object.

11. The radar system of claim 10, wherein the processor is further configured to determine the velocity vector of the object by determining velocity components in a plane transverse to the elevation direction.

12. The radar system of claim 10, wherein the processor is further configured to determine the velocity vector of the object from a difference between a first location of the object at a first time and a second location of the object at a second time.

13. The radar system of claim 10, wherein the antenna array includes a first antenna array and a second antenna array, the processor being further configured to determine the velocity vector of the object from a first Doppler measurement obtained at the first antenna array and a second Doppler measurement obtained at the second antenna array.

14. The radar system of claim 13, wherein the processor is further configured to determine the velocity vector of the object using a separation distance between the first antenna array and the second antenna array.

15. The radar system of claim 9, wherein the processor is further configured to navigate the vehicle based on the determined elevation of the object.

16. A vehicle, comprising:
a radar system including:
a transmitter configured to transmit a reference signal; and
a receiver comprising an antenna array having a plurality of horizontally-spaced antenna elements and configured to receive at least one echo signal related to reflection of the reference signal from an object; and
a processor configured to:
determine a first uncertainty curve associated with an azimuth measurement related to the at least one echo signal;
determine a second uncertainty curve associated with a Doppler measurement related to the at least one echo signal; and
locate an intersection of the first uncertainty curve and the second uncertainty curve to determine an elevation of the object.

17. The vehicle of claim 16, wherein the processor is further configured to:
measure a range, Doppler and azimuth of the object from the at least one echo signal;
determine a velocity vector of the object using the at least one echo signal; and
determine the elevation from the range, Doppler, azimuth and velocity vector of the object.

18. The vehicle of claim 17, wherein the processor is further configured to determine the velocity vector of the object by determining velocity components in a plane transverse to the elevation direction.

19. The vehicle of claim 17, wherein the processor is further configured to determine the velocity vector of the object from a difference between a first location of the object at a first time and a second location of the object at a second time.

20. The vehicle of claim 17, wherein the antenna array includes a first antenna array and a second antenna array, the processor being further configured to determine the velocity vector of the object from a first Doppler measurement obtained at the first antenna array and a second Doppler measurement obtained at the second antenna array.

21. The vehicle of claim 20, wherein the processor is further configured to determine the velocity vector of the object using a separation distance between the first antenna array and the second antenna array.

* * * * *